(12) United States Patent
Solberg

(10) Patent No.: US 6,352,278 B1
(45) Date of Patent: Mar. 5, 2002

(54) TOW BAR ASSEMBLY

(76) Inventor: Glenn S. Solberg, Box 41, Zahl, ND (US) 58856

( * ) Notice: Subject to any disclaimer, the term of this patent is extended or adjusted under 35 U.S.C. 154(b) by 0 days.

(21) Appl. No.: 08/904,705

(22) Filed: Aug. 1, 1997

Related U.S. Application Data

(63) Continuation-in-part of application No. 08/421,405, filed on Apr. 13, 1995, now abandoned, which is a continuation-in-part of application No. 08/110,241, filed on Aug. 23, 1993, now abandoned, which is a continuation-in-part of application No. 07/867,984, filed on Apr. 13, 1992, now abandoned.

(51) Int. Cl.⁷ .............................. B60D 1/167; B60D 1/44
(52) U.S. Cl. ................. 280/482; 280/491.2; 280/491.4; 280/494; 403/109.5; 403/377
(58) Field of Search .................. 280/449, 450, 280/478.1, 479.2, 491.1–491.4, 491.5, 492–494, 495, 498, 499, 500; 182/195; 220/8; 403/83, 122, 110, 325, 324, 322.4, 374.1, 374.2, 374.5, 109.2, 109.5, 377, 378, DIG. 4; 292/341.11, DIG. 18, DIG. 31, DIG. 57

(56) References Cited

U.S. PATENT DOCUMENTS

| | | | |
|---|---|---|---|
| 593,373 A | 11/1897 | Estell | |
| 1,327,338 A | 1/1920 | Levinson et al. | |
| 2,349,301 A | * 5/1944 | Overby | |
| 2,481,685 A | 9/1949 | Rogers | |
| 2,484,751 A | 10/1949 | Schultz | |
| 2,639,160 A | 5/1953 | Studebaker et al. | |
| 2,650,317 A | * 8/1953 | Maclay et al. | |
| 2,667,366 A | 1/1954 | Otjen | |
| 2,914,343 A | 11/1959 | Roth | |
| 3,129,019 A | 4/1964 | Bartone | |
| 3,158,387 A | 11/1964 | Martin | |
| 3,235,296 A | 2/1966 | Day | |
| 3,492,022 A | 1/1970 | Hansen | |
| 3,806,162 A | 4/1974 | Milner | 280/502 |
| 3,984,121 A | 10/1976 | Dobosi | 280/414.1 |
| 4,861,061 A | 8/1989 | Frantz | |
| 4,870,810 A | 10/1989 | Gordy | |
| 4,978,134 A | 12/1990 | Dahl et al. | 280/491.4 |
| 5,011,176 A | 4/1991 | Eppinette | 280/479.3 |
| 5,071,153 A | 12/1991 | Duncan | |
| 5,147,095 A | 9/1992 | Duncan | |
| 5,213,354 A | 5/1993 | Vaughn | |
| 5,356,166 A | 10/1994 | Hahne et al. | |

\* cited by examiner

*Primary Examiner*—Anne Marie Boehler
(74) *Attorney, Agent, or Firm*—Webb Ziesenheim Logsdon Orkin & Hanson, P.C.

(57) ABSTRACT

A coupling for coupling first and second members. The members define an opening for extended and circular counterparts. The counterparts turn on the members and each other while the members contact the counterparts to urge them together. The counterparts, one after another between the members, move and release the members.

20 Claims, 6 Drawing Sheets

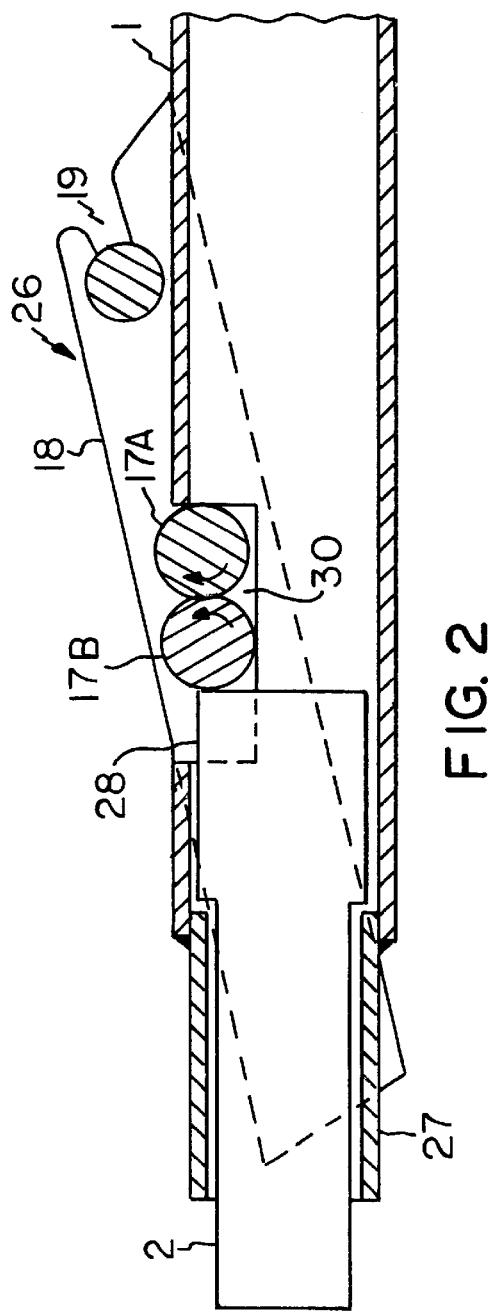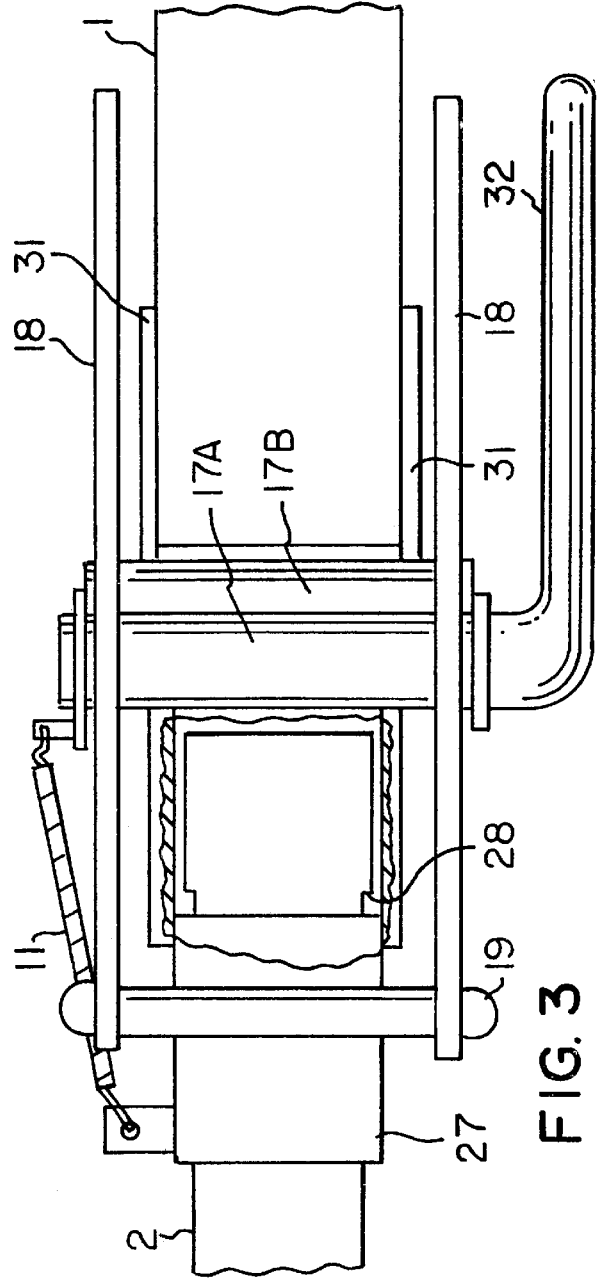

TOW BAR ASSEMBLY

CROSS REFERENCE TO RELATED APPLICATION

This application is a continuation-in-part of U.S. patent application Ser. No. 08/421,405, filed Apr. 13, 1995 and entitled "Extensible Connector With Lock Mechanism"now abandonded, which is a continuation-in-part of U.S. patent application Ser. No. 08/110,241, filed Aug. 23, 1993 and entitled "Pressure Release Systems", now abandonded, which is a continuation-in-part of U.S. patent application Ser. No. 07/867,984, filed Apr. 13, 1992 and entitled "Pressure Release Systems", now abandoned.

BACKGROUND OF THE INVENTION

This invention relates to vehicle tow bars, and more particularly, to foldable and collapsible tow bars which are easily attached and removed from the towed and towing vehicles.

1. Field of the Invention

The tow bar assembly includes telescoping frame members having ends attached to an apex member which in turn mounts to a connecting member which is attached to a towing vehicle. The other ends of the frame members are telescopically adjusted and are secured to the bumper or frame of the towed vehicle. Each telescoping frame member has a pair of telescopic members and a locking mechanism for adjustably securing the members for ease of attachment to the vehicles and for providing a quick release for the frame members for detachment from a vehicle.

2. Description of the Prior Art

Tow bars are known in the prior art. Some are conventional in the sense that they are either single bars or are an A-frame type which are rigidly mounted to the vehicles. Alternatively, collapsible tow bars are known which are arranged to be folded when not in use for storage purposes. Also, the prior art discloses tow bars which include telescopically adjustable members which are secured by locking members and which members are adapted for remote actuation.

U.S. Pat. Nos. 4,978,134; 5,071,153 and 5,147,095 teach the universal mounting of collapsible-telescoping tow bar members.

U.S. Pat. Nos. 5,011,176; 3,984,121; 4,861,061; 2,484,751; 3,492,022; 2,639,160 and 3,158,387 disclose pressure release and/or extension and retraction locking capabilities for telescoping tow bar members. U.S. Pat. No. 3,984,121 discloses a spring biased pivotal mechanism for a locking pin which is adaptable for insertion in complementary openings to adjust and secure telescoping tow bar members. U.S. Pat. No. 2,639,160 discloses an eccentric roller/cylinder member, an eccentric lobe portion which engages complementary notches when rotated to lock telescoping bar members in place. U.S. Pat. No. 3,158,387 discloses cam locking means to secure tow bar telescoping members.

U.S. Pat. No. 2,914,343 discloses a tow bar mounting attached to a vehicle frame under the bumper and telescoped such that it can be retracted to conceal the mount.

U.S. Pat. No. 3,806,162 discloses a clamp attachment to a bumper for a universal tow bar mounting.

U.S. Pat. No. 2,667,366 discloses a remote pin release mechanism to permit actuation for locking and unlocking adjustable telescoping tow bar members.

While the tow bars described in the above-referenced patents provide some advantages, they do not permit the overall versatility of the present invention. For example, in the prior art structures, there is considerable difficulty in releasing the locking mechanism for the tow bar members especially when the towed and towing vehicles are stopped at a position where there is a tension force on the tow bar members. In such a situation it is necessary to dismount the towing vehicle to manually force disengagement of the locking mechanism by utilizing a hammer or the like.

SUMMARY OF THE INVENTION

The invention is directed to an easily attached and detached tow bar assembly that avoids the problems of the prior art.

The invention includes a collapsible and universal mount for the tow bar for ease of storage when not in use. The invention further includes adjustable telescoping frame members for attachment and detachment to towed and towing vehicles regardless of their static position relative to each other.

Each adjustable telescoping tubular frame member includes a pair of telescopic members and an easily actuated release mechanism for securing the telescopic members to each other so that they can be easily released either remotely or otherwise despite the fact that the vehicles may cause considerable tension forces on the bars. For example, the vehicles may be parked on a hill when it is desired to unhook the tow bar assembly. In this case, it is clear that any release mechanism will be under considerable tension forces making it difficult to effect release without the use of a force applying implement or the like.

Another embodiment of the invention uses roller release members which can be lever actuated. The roller release members cooperate with one another and with the telescopic members such that only finger pressure is needed to release the members from notches in the members.

BRIEF DESCRIPTION OF THE DRAWINGS

FIG. 2 is a partial vertical section of a first embodiment of a pressure release roller locking arrangement;

FIG. 3 is a plan view of a roller locking arrangement similar to that shown in FIG. 2;

DESCRIPTION OF PREFERRED EMBODIMENTS

Figure 1:
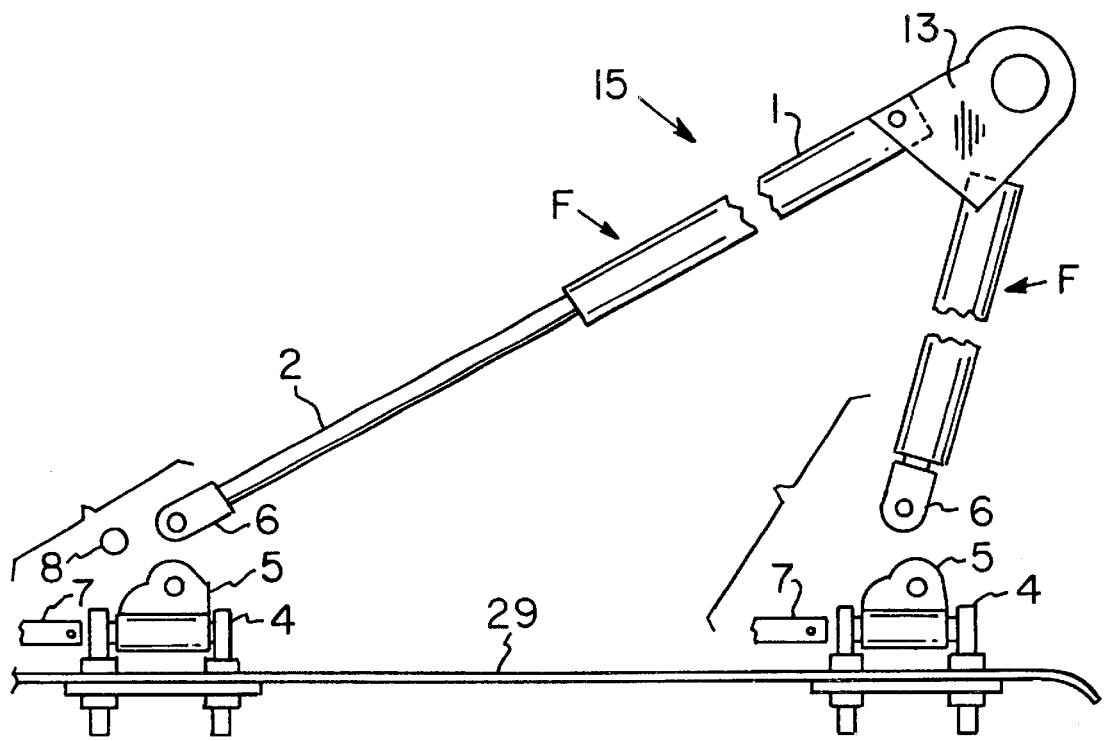
FIG. 1 is a plan view of a tow bar assembly showing telescopically adjustable frame members.

Referring to the drawings in detail, FIG. 1 discloses a tow bar assembly 15 having a pair of frame members F connected to an apex member 13 which can be operatively connected to a towing vehicle (not shown). The other end of each frame member F has a pivot member 6 attached thereto which can be operatively connected to a towed or trailing vehicle (not shown). The tow bar assembly 15 consists of two telescoping tubular frame members F. One of the tubular frame members F is pivotally connected to apex member 13 for movement in a substantially horizontal plane. The other tubular frame member F is fixed to apex member 13.

The trailing end of each frame member F is connected to the bumper 29 of the towed vehicle and, with the elements to be described, form universal connections between the frame members and the vehicle bumper. Each universal connection comprises spaced-apart eye bolt members 4 fastened to the bumper 29 by nuts or the like with the eyes of the eye bolts being disposed on a substantially horizontal axis. Interposed between the eye bolts is a connecting member 5 having both horizontally and vertically disposed apertures. The horizontally disposed aperture is interposed between the eye bolts and is journaled therebetween by a journal pin 7. This permits pivotal movement of the connecting member 5. The vertically disposed aperture of member 5 is connected to pivot member 6 of a frame member. A vertically disposed journal pin 8 extends through the vertical apertures in members 5 and 6 and is secured by any suitable means. The above-described connection between the members 5 and 6 permits pivotal movement of the pivot member 6 in a horizontal plane. The above-described connection between members 4, 5 and 6 permits a universal connection between each frame member F and vehicle bumper 29 so that tow bar assembly 15 is free to move in both horizontal and vertical planes with respect to the bumper.

While only one frame member F has been described as attached to the vehicle bumper, it is readily apparent that the other frame member F of the tow bar assembly 15 is attached to the bumper in a laterally spaced relationship with like connecting means.

The universal connection between each frame member and the vehicle bumper permits multiple types of relative motion between the frame members and bumper thus reducing the strain or stress either to the bumper or the respective frame members especially when towing over uneven or bumpy terrain.

The universal connections between the frame members and the bumper also permit easy mounting, dismounting and collapsible storage for tow bar assembly 15. Frame members F can be easily disconnected from eye bolts 4 by removing journal pins 7. Thereafter, frame members F can be folded together by virtue of their pivotal connection to apex member 13, and stowed in a convenient location. Alternatively, only one frame member need be disconnected and swung together in adjacent relationship with the other frame member and both frame members may be swung in parallel relationship with the vehicle bumper by virtue of the vertically disposed pin 8 to a storage position. Additionally, both frame members may be swung on journal pins 7 in a vertical plane to an upright position against the vehicle for storage.

Each frame member F is comprised of an outer or first tubular telescopic member 1 and an inner or second tubular telescopic member 2 which permit axial adjustment of the frame members for ease of connection between the towing and towed vehicles. Each frame member F has a locking means interposed between telescopic members 1 and 2 thereof for locking the telescopic members in various adjusted positions and for providing easily releasable means for unlocking the telescopic elements under a variety of conditions.

Figure 15:
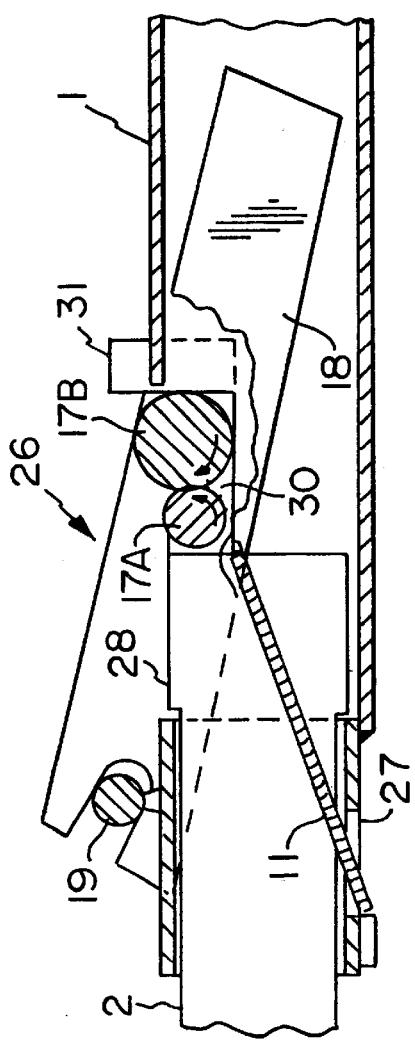
FIG. 15 is a partial vertical section of a locking arrangement similar to FIG. 2 showing a roller release hinge pivot arranged opposite to FIG. 2.

FIGS. 2, 3 and 15 illustrate a preferred embodiment of a high pressure roller release mechanism 26. FIGS. 3 and 15 show a first tubular telescopic member 1 having a given dimension and a short tubular extension member 27 attached to the first tubular telescopic member 1 at one end. The tubular extension member 27 has an outer dimension less than the inner dimension of first tubular telescopic member 1.

A second tubular telescopic member 2 having a second surface is slidable within first tubular telescopic member 1 and tubular extension member 27 and has a raised shoulder 28 adapted to be engaged with one end of tubular extension member 27. The first tubular telescopic member 1 has a notch 30 intermediate its ends with the notch 30 having a first surface formed by an enlarged abutment 31 at one end. The abutment 31 is formed by an abutment assembly comprising a pair of metal plates attached by conventional means, such as welding, to each side of the tubular member 1 adjacent the notch 30. The plates are positioned such that one end of each plate extends beyond the end of the notch 30 so that when the rollers 17A and 17B are in a locking position in the notch 30, the right most roller 17A, as shown in FIG. 2, contacts the ends of the plates rather than the notch end formed in the tubular member 1. These plates help prevent wear of the notch end in the tubular member 1 and can be replaced when they become worn. Still referring to FIG. 15, there is illustrated a pivot pin 19 fastened to the upper portion of tubular extension member 27 adjacent the notch 30. Pivot plates 18 are rotatably mounted on pivot pin 19 on opposite sides of first tubular telescopic member 1.

Rotatable elements or cylindrical movable members, such as roller members 17A and 17B, are each mounted and freely rotatable between pivot plates 18. The pivot plates 18 thus act as a roller holder to move the rollers 17A and 17B in unison. Roller 17A may be smaller in diameter than roller 17B and roller 17A has a handle 32 attached thereto, as shown in FIG. 3 of the drawings. The pair of roller members 17A and 17B are shown as in frictional contact and dimensioned so they are also in frictional contact with the raised shoulder 28 (second surface) and enlarged abutment 31 (first surface) when located within notch 30.

When the roller members 17A and 17B are within notch 30, they lock first and second tubular telescopic members 1 and 2 in an extended relationship. The release of the tubular telescopic members is effected by rotating roller member 17A with handle 32 thereby causing the roller members to ride up abutment 31, i.e., the ends of the plates extending into the notch, and the wall of shoulder 28 until the roller members exit the upper open end of notch 30 thereby freeing tubular telescopic members 1 and 2 to telescope. It will be appreciated by those skilled in the art that the different diameter frictional contact roller members provide a high leverage release mechanism when used in conjunction with the notch walls.

FIG. 2 is a mirror image of FIG. 15. However, in this arrangement, the abutment is eliminated allowing direct contact of roller member 17A with first tubular member 1.

Figure 16:
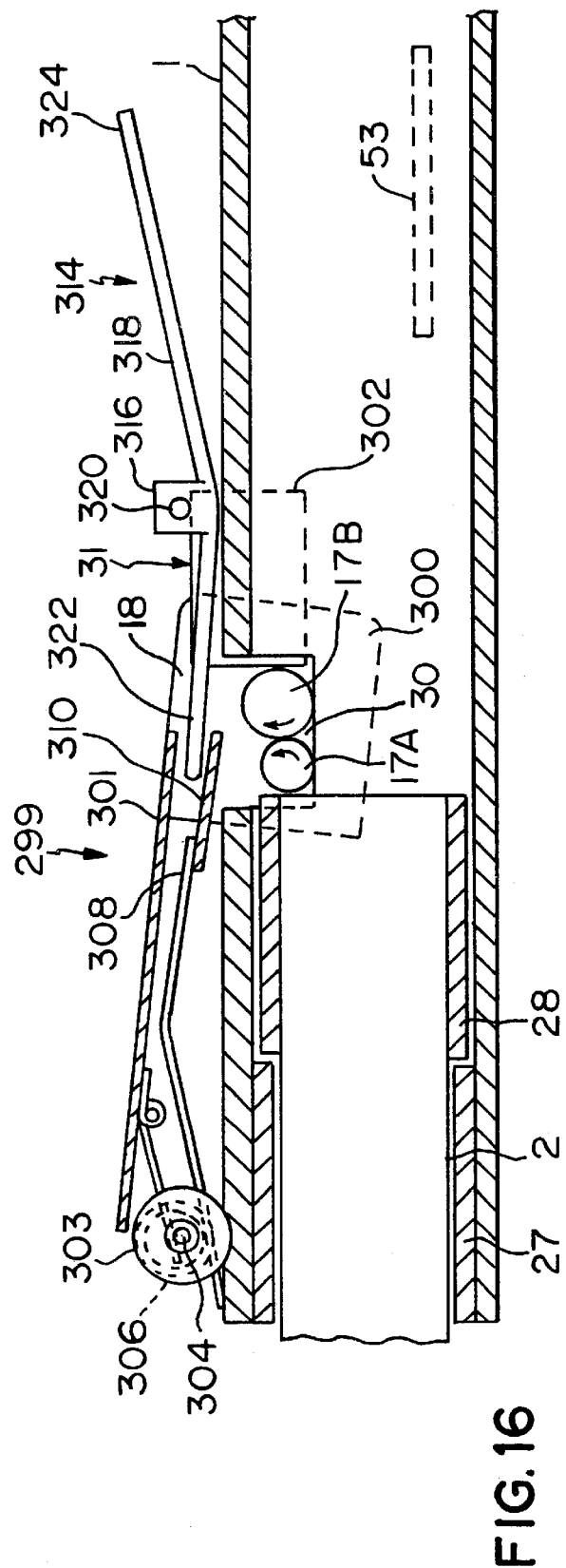
FIG. 16 is a side, sectional view of an alternative embodiment of a tow bar locking arrangement.

A tow bar with an alternative release mechanism embodiment 299 is shown in FIG. 16 of the drawings. In this embodiment 299, the rollers 17A and 17B are rotatably carried between two spaced-apart pivot plates 300. A connecting plate 301 extends between the two pivot plates 300 and joins the two pivot plates 300 together. An abutment 31 is provided which is formed by an abutment assembly having two plates 302 attached to opposite sides of the outer telescopic member 1. The ends of the plates 302 extend beyond the notch wall so that in the engaged position shown in FIG. 16, the right most roller 17B contacts the abutment 31 of the first telescopic member 1. The connecting plate 301 is sized such that the pivot plates 300 maintain a movable clearance from the plates 302 of the abutment 31.

Two circular members 303, such as two spaced-apart washers, are fastened on top of the first telescopic member 1 forward of the notch 30, as shown in FIG. 16. A rod or pin 304 extends between the two circular members 303, for example, through the holes in the washers. A spring 306 is mounted on the pin 304 and a distal end 308 of the spring 306 extends toward the notch 30. The distal end 308 of the spring 306 contacts the top side of a pressure plate 310 which is attached to, and extends between, the two pivot plates 300. The force of the distal end 308 of the spring 306 causes the roller holder to be biased in a counterclockwise direction until the connecting plate 301 contacts the spring 306 or circular members 303, thus determining the height of the rollers 17A, 17B in relation to each other and the members 1 and 2. The rollers 17A, 17B hitting the bottom of the notch 30 complete the positioning of the roller holder and the rollers 17A, 17B. The horizontal positioning of the rollers 17A and 17B can be further individually changed by moving the holes in pivot plates 300 through which the rollers 17A, 17B pass. The rollers can be positioned in parallel with the bottom of the notch 30 or either can be above or below the other and can be the same size. The distal end 308 of the spring 306 between the connecting plate 301 and pressure plate 310 helps prevent over pivoting of the roller holder. While the embodiment 299 described above utilizes two rollers, it could also be embodied with, for example, three triangularly positioned rollers in the holder.

A pry bar assembly 314 is mounted on the outer tube 1. The pry bar assembly 314 includes two nuts 316 attached, for example, by welding, to a pry bar 318. A rod or pin 320 extends through the nuts 316 and is welded or fastened to the top of the plates 302 of the abutment 31, thus allowing pivotal movement of the pry bar 318. A first end 322 of the pry bar 318 is located under the connecting plate 301 of the roller holder. In order to assist removing the rollers from the notch 30, a circular handle can be attached to one of the rollers, similar to the handle 32 shown in FIG. 3 of the drawings. By turning the circular handle, the roller associated therewith turns and crawls up the walls of the notch, thus exiting the notch. The handle can include a slot into which a key or small bar may be inserted to help provide turning leverage to turn the roller. As shown in FIG. 16, by exerting a downward pressure on the second end 324 of the pry bar 318, the first end 322 pivots upwardly contacting the underside of the connecting plate 300 and causing the rollers to move up the notch substantially parallel with the notch walls. This helps prevent roller slippage and roller holder binding and helps prevent twisting of the roller holder against the rollers.

While the rollers shown in the preferred embodiments have a smooth outer surface, notched rollers, such as long, gear-like members could also be used. In such an embodiment, the shoulder of the second telescopic member and the ends of the abutment plates extending beyond the notch walls would preferably have notches so that the teeth on the geared rollers would engage the notches to help move the geared rollers out of the notch. Additionally, the rollers would not have to be held in a roller holder but simply be two individual rollers insertable into the notch. Alternatively, the rollers can be embodied as roller bearings.

Figure 4:
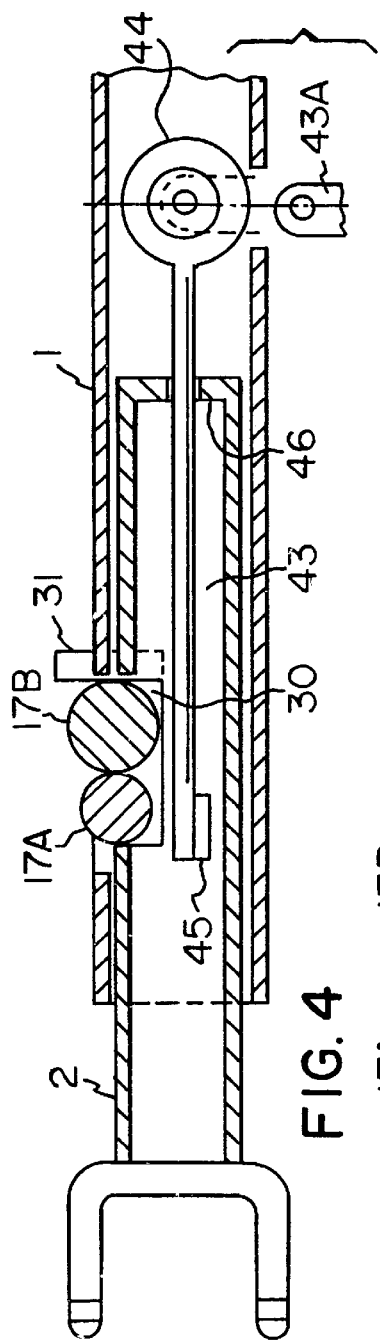
FIGS. 4–6 are partial vertical sections of telescopic members having different stops for limiting the extension and the retraction of the telescoping members.
Figure 5:
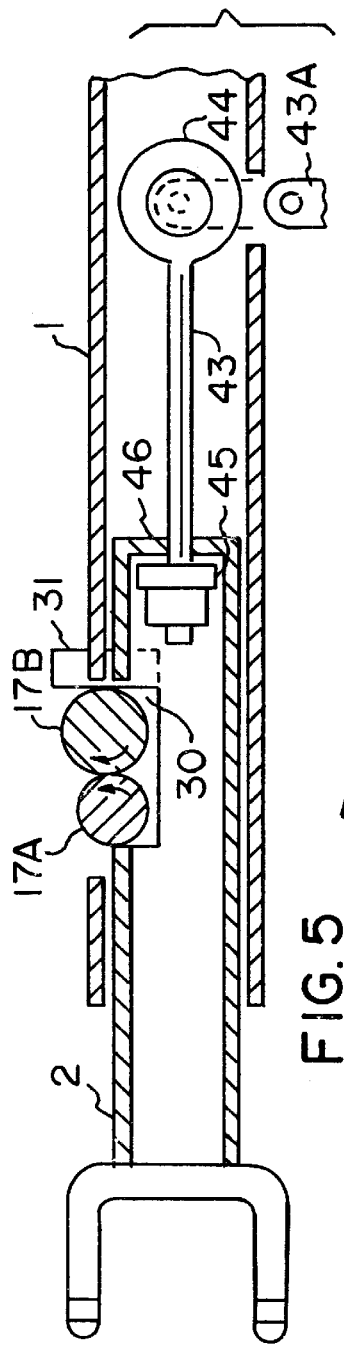

FIGS. 4 and 5 illustrate limiting stop arrangements for telescopic members 1 and 2. When roller members 17A and 17B are released from notch 30, telescopic members 1 and 2 may telescope. An eye bolt 43 is located within the telescopic members and has stops 44 and 45 at each end, respectively. Upon release of the rollers from notch 30, second telescopic member 2 can telescope to the left, as shown in FIG. 4, until stop 45 strikes an end plate 46. The second telescopic member 2 can telescope to the right until end plate 46 strikes stop 44. The eye bolt 43 is secured or maintained in place relative to first telescopic member 1 by a pin 43A which can be inserted through an aperture in first telescopic member 1 and connected with stop 44.

Figure 6:
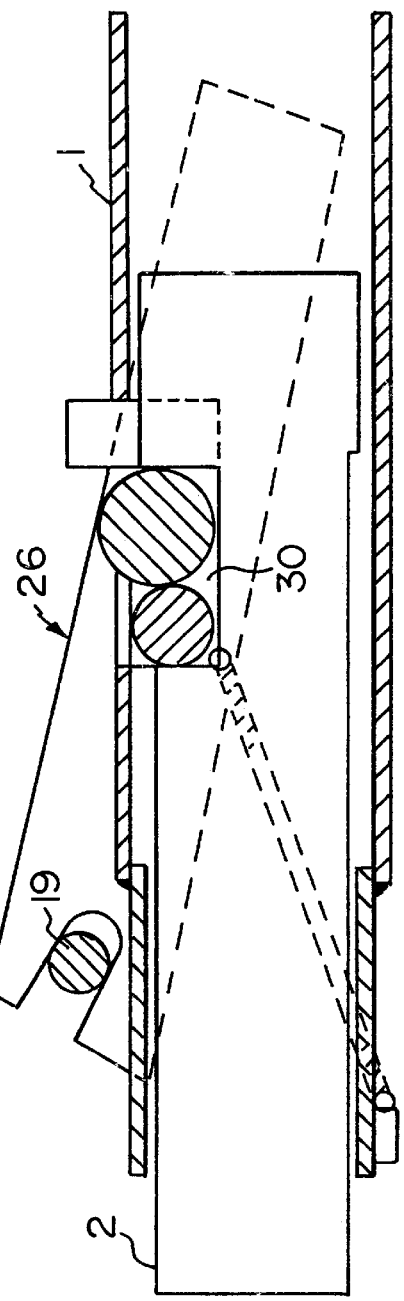

FIG. 6 illustrates a roller release mechanism wherein notches 30 are located in both telescopic members 1 and 2 rather than only in first telescopic member 1 as shown in FIGS. 2 and 15.

Figure 7:
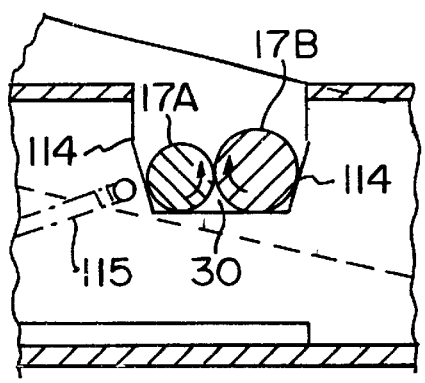
FIGS. 7–12 are side elevations showing different notch configurations.
Figure 8:
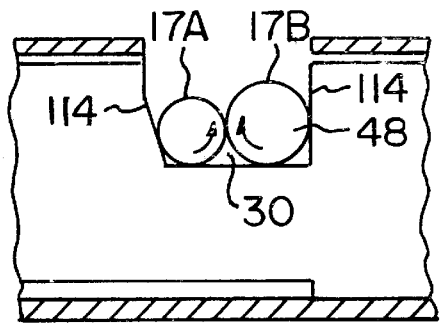
Figure 9:
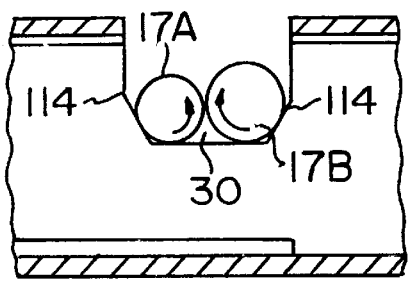
Figure 11:
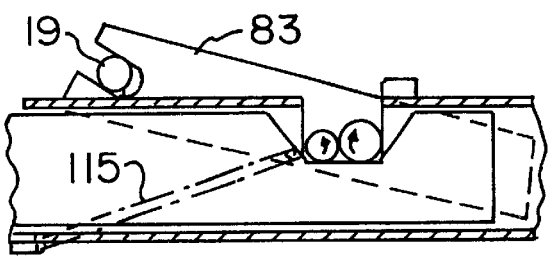
Figure 10:
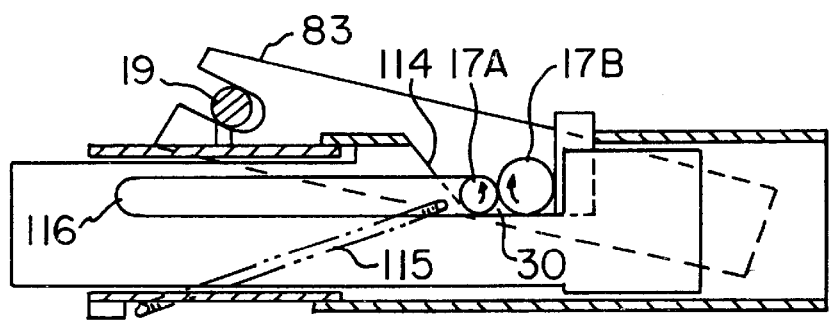
Figure 12:
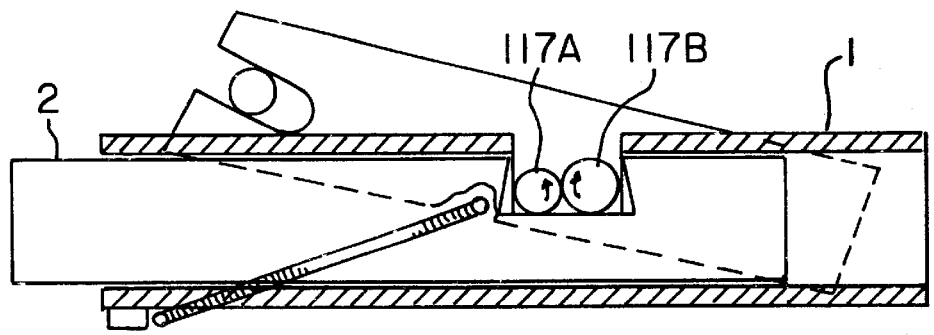

FIGS. 7 and 8 show various modified roller release mechanisms utilized for special purposes. If walls 114 of notch 30 are angled, as shown in FIG. 7, the forces on the rollers will cause roller members 17A and 17B to rotate to relieve the forces. The amount of force which will cause the rollers to rotate is determined by the angle of the notch wall and the resilience of coil spring 115. This causes the roller members 17A and 17B and the roller holder 83 to move toward pivot pin 19. To minimize this problem, both notch walls 114 are angled one-half as much, as in FIG. 7. The notch 30 in FIG. 8 has walls 114 which are angled at the bottom and are parallel at the top. This will cause roller holder 83 to move slightly when enough force is applied. It could be used to set off a switch indicating that enough force has been applied. When the roller members get to the parallel walls at the top, they will go no further unless the roller release lever 116 shown in FIG. 10 is turned to relieve the force on the roller members. FIG. 8 shows two angles on one side only. It would take twice as much pressure to move the roller members in FIG. 8 than in FIG. 7. FIG. 9 has curved notch walls. This causes the roller members to move with graduating amounts of force until they reach the parallel walls at the top of the notch. The curved walls could also be curved all the way to the top of the notch until enough force causes the roller members to roll out of the notch and relieve the force, as in FIG. 9. FIG. 10 has cushioning in both directions, yet the roller members have limited lateral movement. With this release mechanism, the hitch would unhook completely when released and would release in both directions.

Figure 13:
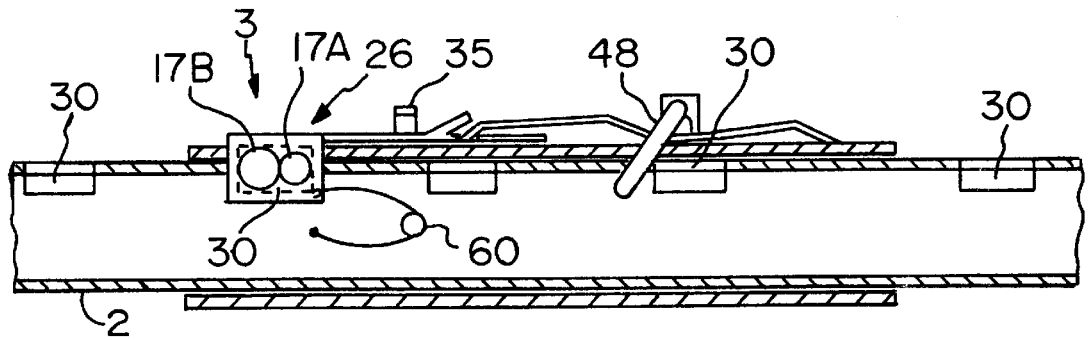
FIG. 13 is a partial vertical section showing variations of the invention.

In FIG. 13, the locking and release mechanism 3 or roller release mechanism 26 can be on top. If the release mechanism 26 is on top, roller members 17A and 17B, or pin 9 and plate 20, must have a lift spring, such as a torsion spring 60 or a leaf spring 61, to push them into aperture 10 when cam 49 is released. The bias means 47 must be more rigid than the lift spring so that when cam 49 is engaged, pin 9 falls into aperture 10. In FIG. 13, torsion spring 60 assists in moving the roller members 17A and 17B out of the notch when cam 49 is released.

Figure 14:
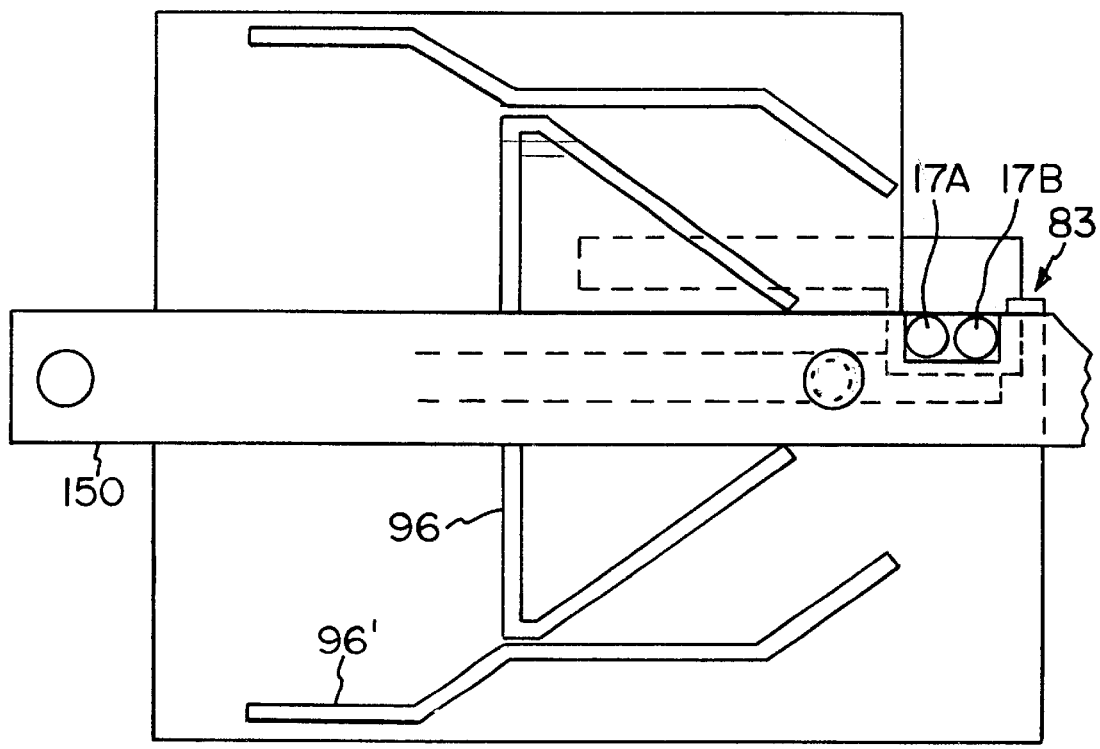
FIG. 14 is a plan view of another embodiment.

The device shown in FIG. 14 has a roller release for release in both directions. Approximately 2" in one direction and 4" in the other direction. This hitch telescopes and swivels laterally and has force release in both directions. The guides 96 of a cushion tube 150 along with pin 130, guide tube 150 straight as a vehicle is backed up to line up for the roller lock. Guides 96' are mounted on the hitch frame. When roller members 17A and 17B roll out, the hitch can go in either direction. Tube 150 is tapered at the right end, as shown in FIG. 14, to enter roller members 17A and 17B. The tube 150 does not hurt the roller holder 83 because the roller holder 83 is under the hitch frame, top and bottom. This hitch can be pulled from the left for a pick-up or from the right on a cultivator or an anhydrous trailer. The tapered end 151 at the right could be lengthened and pulled. The hitch would lock when the vehicle is pulled ahead. The hitch has safety stops in both directions.

While a number of embodiments of the invention are described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A tow bar assembly including first and second elongated frame members and a connecting member, each of said first and second elongated frame members including a first telescopic member having an opening, a first end connected to said connecting member and a second open end, each of said first and second elongated frame members including a second telescopic member having a first end slidable within said open end of said first telescopic member and a distal end, a locking means for releasably locking said first and second telescopic members in an extended position, said locking means including a movable member comprising a plurality of rotatable elements adapted to extend between and contact said first and second telescopic members to maintain said first and second telescopic members in a locked relationship, and a release means mounted on one of said telescopic members to move said movable member out of contact with said first and second telescopic members to permit slidable movement between said first and second telescopic members, wherein said release means includes a holder mounted on said first telescopic member and said plurality of rotatable elements are rotatably mounted on said holder for selected movement into and out of said opening in said first telescopic member to lock and release said first and second telescopic members relative to each other, wherein said rotatable elements extend substantially perpendicular to a longitudinal axis of said first and second telescopic members when in said opening, and wherein said release means is configured such that rotation of said rotatable elements causes said rotatable elements to roll out of said opening and out of engagement with both said first and second telescopic members to release said first and second telescopic members.

2. A tow bar assembly as set forth in claim 1 including a plurality of universal connectors, with one of said universal connectors attached to said distal ends of each of said second telescopic members for attaching said tow bar assembly to a towed vehicle.

3. A tow bar assembly as set forth in claim 1 wherein said connecting member is an apex member for attaching said tow bar assembly to a towing vehicle, and said first end of said first telescopic member of said first elongated frame member is pivotally connected to said apex member and said first end of said first telescopic member of said second frame member is fixed to said apex member.

4. A tow bar assembly as set forth in claim 1 including a shoulder located on said second telescopic member for registration with said opening formed in said first telescopic member when said first and second telescopic members are in said extended position, said movable member is adapted to extend into said opening in said first telescopic member and to contact said shoulder on said second telescopic member to lock said first and second telescopic members in said extended position.

5. A tow bar assembly as set forth in claim 1 wherein said locking means includes at least one opening formed in said second telescopic member for alignment with said opening formed in said first telescopic member when said first and second telescopic members are in said extended position, said movable member adapted to extend into said aligned openings in said first and second telescopic members to lock said first and second telescopic members in said extended position.

6. A tow bar assembly as set forth in claim 1 wherein said opening in said first telescopic member is a notch, said locking means includes said notch formed in said first telescopic member, a plurality of notches formed in said second telescopic member for alignment with said notch formed in said first telescopic member when said first and second telescopic members are in said extended position, said movable member adapted to extend into said aligned notches in said first and second telescopic members to lock said first and second telescopic members together in said extended position, and wherein said movable member is movable into and out of said aligned notches in said first and second telescopic members to lock and release said first and second telescopic members relative to each other.

7. A tow bar assembly as set forth in claim 5 including stop means located within and connectable with said first telescopic member and extending into said second telescopic member to prevent separation of said first and second telescopic members as a result of overextending said second telescopic member relative to said first telescopic member.

8. A tow bar assembly including first and second elongated frame members and a connecting member, each of said first and second elongated frame members including a first telescopic member having a first end connected to said connecting member and a second open end, each of said first and second elongated frame members including a second telescopic member having a first end slidable within said open end of said first telescopic member and a distal end, a locking means for releasably locking said first and second telescopic members in an extended position, said locking means including at least one movable member adapted to extend between and contact said first and second telescopic members to maintain said first and second telescopic members in a locked relationship, and a pivotally mounted release means mounted on one of said telescopic members to move said at least one movable member out of contact with said first and second telescopic members to permit slidable movement between said first and second telescopic members, wherein said locking means includes a notch means formed in said first telescopic member, a notch means formed in said second telescopic member adapted to be aligned with said notch means in said first telescopic member when said first and second telescopic members are in an extended relationship, wherein said release means is a lever pivotally mounted on said first telescopic member, a plurality of rollers rotatably mounted on said lever for selective movement into and out of said aligned notch means in said first and second telescopic members to lock said first and second telescopic members in an extended position when located in said notch means to prevent slidable movement between said first and second telescopic members.

9. A tow bar assembly as set forth in claim 8 including an extension member attached to said open end of said first telescopic member, said extension member having an inner cross section dimension less than the inner cross section dimension of said first telescopic member and having an inner shoulder located within said second end of said first telescopic member, said first end of said second telescopic member having a shoulder located within said first telescopic member adapted to engage said inner shoulder of said extension member, said notch means in said first telescopic member having spaced end walls, said lever including a pivot plate pivotally connected on each side of said extension member and said plurality of rollers extending laterally between said pivot plates and freely rotatable thereon, a handle attached to one of said plurality of rollers for rotating said roller and pivoting said pivot plates relative to said extension member, whereby one of said plurality of rollers is in frictional contact with at least one other of said plurality of rollers and one of said plurality of rollers is in frictional contact with one of said spaced end walls of said notch means, and spring means extending between one of said pivot plates and said extension member for urging said plurality of rollers into said notch means to maintain said first and second telescopic members in a fixed relationship, whereby release of said first and second telescopic members is affected by simultaneously rotating said plurality of rollers relative to said pivot plates and pivoting said pivot plates relative to said extension with said handle to cause said rollers to exit said notch means to free said first and second telescopic members for relative sliding movement.

10. A tow bar assembly as set forth in claim 8 including a plurality of notch means in said second telescopic member, each of said notch means cooperating with said locking means on said first telescopic member to lock said first and second telescopic members in different extended positions.

11. A tow bar assembly as set forth in claim 8 including stop means located within and connectable with said first telescopic member and extending into said second telescopic member to prevent separation of said first and second telescopic members as a result of overextending said second telescopic member relative to said first telescopic member.

12. A tow bar assembly including a pair of elongated longitudinally adjustable members, each of said elongated longitudinally adjustable members having a first end for connection to an apex member adapted to be connected to a towing vehicle, each of said elongated longitudinally adjustable members having a first telescopic member and a second telescopic member slidable relative to said first telescopic member, a locking means for connecting said first and second telescopic members in one of a plurality of preselected positions, and a universal mounting means adapted to be connected to said towed vehicle connected to a second end of each of said elongated longitudinally adjustable members, said universal mounting means comprising a pair of laterally spaced coaxial eye bolts adapted to be connected to a towed vehicle, a hollow connecting member located between said spaced eye bolts, a journal pin extending through said spaced eye bolts and said hollow connecting member to permit rotary movement of said hollow connecting member around said journal pin, said hollow connecting member including a journaled extension for connection to said second end of one of said longitudinally adjustable members to provide rotary movement of said longitudinally adjustable member in a substantially horizontal plane, said locking means including notch means formed in said first telescopic member, a holder mounted on said first telescopic member, and roller means mounted on said holder and configured to engage said notch means and cooperate with said first and second telescopic members to prevent slidable movement between said first and second telescopic members.

13. The tow bar assembly as set forth in claim 12, wherein said hollow connecting member is perpendicular to said journal pin.

14. A tow bar assembly including an elongated frame member and a connecting member, said elongated frame member including a first member having a first end connected to said connecting member and a second open end, a second member having a first end longitudinally slidable within said open end of said first member and a distal end, locking means for releasably locking said first and second members in an extended position, said locking means including at least one movable member adapted to extend between and contact said first and second members to maintain said first and second members in said extended position, and release means mounted on one of said members to move said at least one movable member out of contact with said first and second members to permit longitudinal slidable movement between said first and second members, wherein said locking means includes a notch formed in said first member, contact means formed on said second member and adapted to be aligned with a portion of said notch in said first member when said first and second members are in said extended position, wherein said release means includes a holder, a plurality of rollers rotatably mounted on said holder for selective movement into and out of said notch in said first member to lock said first and second member in said extended position when located in said notch to prevent longitudinal slidable movement between said first and second members, wherein said rollers extend substantially perpendicular to a longitudinal axis of said first and second members when located in said notch, and wherein said release means is configured such that rotation of said rollers causes said rollers to roll out of said notch and out of engagement with both said first and second members to release said first and second members.

15. A tow bar assembly as set forth in claim 14 including an extension member attached to said open end of said first member, said extension member having an inner cross section dimension less than an inner cross section dimension of said first member and having an inner shoulder located within said second end of said first member, said first end of said second member having a shoulder located within said first member adapted to engage said inner shoulder of said extension member, said notch in said first member having spaced end walls, said holder including a pivot plate pivotally connected on each side of said first member and said plurality of rollers extending laterally between said pivot plates and rotatable thereon, a handle attached to one of said plurality of rollers for rotating said roller to which said handle is attached and pivoting said pivot plates relative to said first member, whereby one of said plurality of rollers is in frictional contact with at least one other of said plurality of rollers, and spring means extending between one of said pivot plates and said first member for urging said plurality of rollers into said notch to maintain said first and second members in said extended position, whereby release of said first and second members is effected by simultaneously rotating said plurality of rollers relative to said pivot plates and pivoting said pivot plates relative to said first member with said handle to cause said rollers to exit said notch to free said first and second members for relative longitudinal sliding movement.

16. A tow bar assembly as set forth in claim 14 including stop means located within and connectable with said first member and extending into said second member to prevent separation of said first and second members as a result of overextending said second member relative to said first member.

17. A tow bar assembly comprising:
a first telescopic member having an open end and a notch, said notch having opposed ends;
a second telescopic member having a first end slidable within said open end of said first telescopic member;

an abutment assembly attached to said first telescopic member and extending partially beyond one of said ends of said notch;

a roller release mechanism for releasably locking said first and second telescopic members in an extended position, said roller release mechanism including a plurality of rollers configured to engage said notch such that in said extended position one of said rollers abuts said first end of said second telescopic member and another of said rollers abuts said abutment assembly to hold said first and second telescopic members in said extended position.

18. A tow bar assembly comprising:

a first member having an open end and a notch, said notch having opposed ends;

a second member having a first end slidable within said open end of said first member;

a roller release mechanism for releasably locking said first and second members in an extended position, said roller release mechanism including a plurality of rollers mounted in a holder, said rollers configured to engage said notch such that in said extended position one of said rollers abuts said second member and another of said rollers abuts an end of said notch of said first member to hold said first and second members in said extended position, wherein said rollers and roller release mechanism are configured such that rotation of said rollers causes said rollers to roll out of said notch and out of engagement with both said first and second members to release said first and second members.

19. The tow bar assembly as set forth in claim 18, wherein said second member is hinged.

20. The two bar assembly as set forth in claim 18, including two sets of first and second members, said two sets located adjacent to one another and connected to an apex.

* * * * *